US012757122B2

(12) United States Patent
Semel et al.

(10) Patent No.: US 12,757,122 B2
(45) Date of Patent: Oct. 6, 2026

(54) BATTERY LIFETIME EXTENSION FOR WIRELESS DEVICES USING MESSAGE ENERGY PREDICTION

(71) Applicant: ALTAIR SEMICONDUCTOR LTD, Hod Hasharon (IL)

(72) Inventors: Lavi Semel, Tel Aviv (IL); Itay Lusky, Kfar Saba (IL); Roi Cohen, Tel Aviv (IL); Stav Ben-Nun, Rishon LeZion (IL); Alon Kostianovsky, Gedera (IL); Tal Avidor, Rosh Ha'ayin (IL)

(73) Assignee: ALTAIR SEMICONDUCTOR LTD, Hod Hasharon (IL)

( * ) Notice: Subject to any disclaimer, the term of this patent is extended or adjusted under 35 U.S.C. 154(b) by 325 days.

(21) Appl. No.: 18/571,265

(22) PCT Filed: Jun. 28, 2022

(86) PCT No.: PCT/IB2022/055970
§ 371 (c)(1),
(2) Date: Dec. 18, 2023

(87) PCT Pub. No.: WO2023/275724
PCT Pub. Date: Jan. 5, 2023

(65) Prior Publication Data

US 2024/0284337 A1 Aug. 22, 2024

Related U.S. Application Data

(60) Provisional application No. 63/217,304, filed on Jul. 1, 2021.

(51) Int. Cl.

| | |
|---|---|
| ***G06F 1/32*** | (2019.01) |
| ***G06F 1/3287*** | (2019.01) |
| ***H04W 52/02*** | (2009.01) |

(52) U.S. Cl.
CPC ...... *H04W 52/0258* (2013.01); *G06F 1/3287* (2013.01)

(58) Field of Classification Search
CPC ............... H04W 52/0258; H04W 4/70; H04W 52/0225; H04W 52/0277; H04W 52/0216;
(Continued)

(56) References Cited

U.S. PATENT DOCUMENTS

2005/0046567 A1 3/2005 Mortenson et al.
2012/0210325 A1* 8/2012 de Lind van Wijngaarden .......... H04W 52/0258 718/103

(Continued)

FOREIGN PATENT DOCUMENTS

EP 2921004 B1 3/2016
EP 2929732 B1 10/2016
EP 3210420 B1 8/2018

OTHER PUBLICATIONS

International Search Report and Written Opinion mailed on Oct. 6, 2022, received for PCT Application PCT/IB2022/055970, filed on Jun. 28, 2022, 7 pages.

*Primary Examiner* — Lan-Huong Truong
(74) *Attorney, Agent, or Firm* — Meitar Patents Ltd.; Daniel Kligler

(57) ABSTRACT

A method for communication includes collecting information relating at least to communication of a wireless device over a wireless communication network. An energy-prediction model, which predicts amounts of energy needed in the wireless device for performing communication operations in the wireless communication network, is maintained based on the collected information. For a communication operation that is to be performed by the wireless device in the wireless communication network, a time at which the communication operation will be performed is scheduled based (Continued)

on the energy-prediction model. The communication operation is performed at the scheduled time.

16 Claims, 6 Drawing Sheets

(58) Field of Classification Search
CPC .. H04W 52/0261; G06F 1/3287; G06F 1/329; G06F 1/3212; Y02D 30/70
See application file for complete search history.

(56) References Cited

U.S. PATENT DOCUMENTS

| | | | | |
|---|---|---|---|---|
| 2014/0003261 | A1* | 1/2014 | GIllett | H04W 48/16<br>370/252 |
| 2017/0127348 | A1 | 5/2017 | Poleg | |
| 2019/0281554 | A1 | 9/2019 | Nolan et al. | |
| 2019/0303811 | A1 | 10/2019 | Tal et al. | |
| 2020/0213949 | A1 | 7/2020 | Bria | |
| 2020/0275368 | A1* | 8/2020 | Puchko | H04W 52/02 |
| 2021/0094435 | A1* | 4/2021 | Rechkemmer | B60L 53/66 |
| 2021/0211208 | A1* | 7/2021 | Wali | G01R 29/0857 |
| 2022/0104130 | A1* | 3/2022 | Mouffok | E21B 47/14 |
| 2022/0345998 | A1* | 10/2022 | Menon | H04W 88/06 |
| 2023/0139514 | A1* | 5/2023 | Tennant | H02J 3/004<br>700/291 |

* cited by examiner

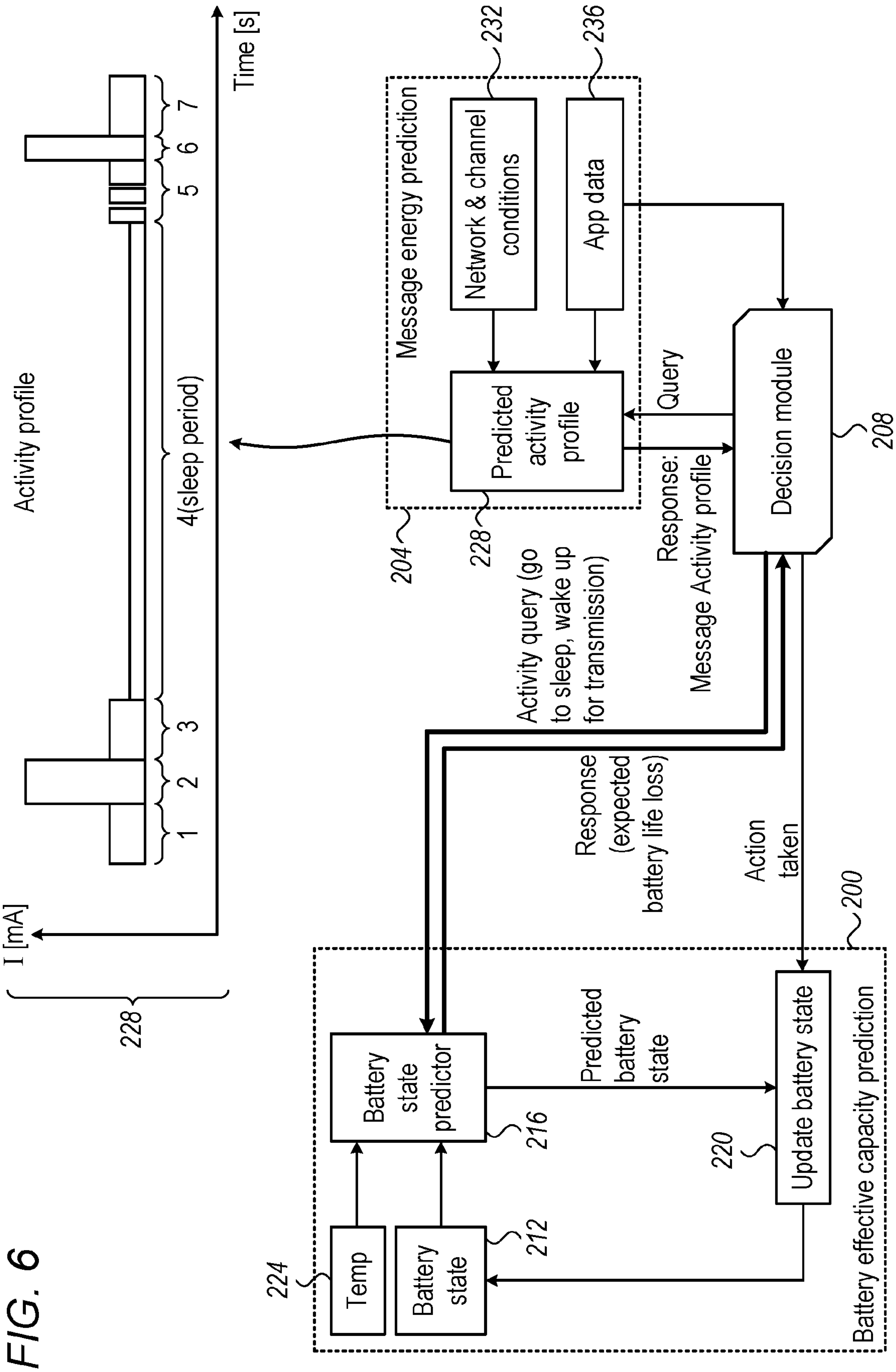

FIG. 6
Activity profile
I [mA]
Time [s]
1
2
3
4(sleep period)
5
6
7
228
Message energy prediction
Network & channel conditions
App data
Predicted activity profile
Query
Response: Message Activity profile
Decision module
232
236
204
228
208
Activity query (go to sleep, wake up for transmission)
Response (expected battery life loss)
Action taken
200
Battery effective capacity prediction
Battery state predictor
Predicted battery state
Update battery state
Temp
Battery state
224
212
216
220

BATTERY LIFETIME EXTENSION FOR WIRELESS DEVICES USING MESSAGE ENERGY PREDICTION

CROSS-REFERENCE TO RELATED APPLICATIONS

This application is based on PCT Filing PCT/IB2022/055970, filed Jun. 28, 2022, which claims the benefit of U.S. Provisional Patent Application 63/217,304, filed Jul. 1, 2021, the disclosure of each is incorporated herein by reference.

FIELD OF THE INVENTION

The present invention relates generally to wireless communication, and particularly to methods and systems for reduction of energy consumption of wireless devices.

BACKGROUND OF THE INVENTION

Energy consumption is a major factor in the design and operation of many wireless devices, one typical example being Internet-of-Things (IoT) devices. Some IoT devices are required to operate on a non-rechargeable battery for several years, and may be installed in locations that dictate harsh communication conditions. Furthermore, IoT devices are typically constrained to an extremely low-cost design, thereby limiting their communication capabilities. All these factors make it crucial for an IoT device to consume as little energy as possible.

SUMMARY OF THE INVENTION

An embodiment of the present invention that is described herein provides a method for communication, including collecting information relating at least to communication of a wireless device over a wireless communication network. An energy-prediction model, which predicts amounts of energy needed in the wireless device for performing communication operations in the wireless communication network, is maintained based on the collected information. For a communication operation that is to be performed by the wireless device in the wireless communication network, a time at which the communication operation will be performed is scheduled based on the energy-prediction model. The communication operation is performed at the scheduled time.

In various embodiments, performing the communication operations includes communicating messages over the wireless communication network, scanning for availability of the wireless communication network, waking-up a modem of the wireless device and receiving signal by the modem, and/or setting a modem of the wireless device to a sleep period. Typically, scheduling the time includes deciding on the time in accordance with a scheduling policy that aims at least to maximize a lifetime of a battery of the wireless device.

In some embodiments, collecting the information includes collecting information relating to a battery of the wireless device, maintaining the energy-prediction model includes predicting, based on the information relating to the battery, an effective energy capacity remaining in the battery following the communication operation, and scheduling the time depends on the effective energy capacity.

In an embodiment, scheduling the time includes deciding whether to perform the communication operation in a current time period or to defer a decision on performing the communication operation to a later time period. In another embodiment, collecting the information further includes collecting additional information relating to communication of one or more additional wireless devices over the wireless communication network, and maintaining the energy-prediction model is based both on the information relating to the wireless device and on the additional information relating to the additional wireless devices.

In various embodiments, maintaining the energy-prediction model is performed in the wireless device, in a server that communicates with the wireless device over the wireless communication network, or partially in the wireless device and partially in a server that communicates with the wireless device over the wireless communication network.

In a disclosed embodiment, collecting the information includes waking-up a modem of the wireless device, and/or of one or more additional wireless devices, to collect the information in one or more dedicated wake-up periods, which are dedicated for maintaining the energy-prediction model. In a disclosed embodiment, scheduling the time based on the energy-prediction model includes receiving a total energy budget that should not be exceeded in communicating the message, and scheduling the time so as to meet the total energy budget.

In an embodiment, the method further includes sharing at least part of the collected information, or preprocessed information that is derived from the collected information, with an operator of the wireless communication network. Additionally, or alternatively, the method may further include reporting, based on the collected information, an anomality or a statistical information regarding the battery.

There is additionally provided, in accordance with an embodiment of the present invention, a communication apparatus including a wireless device and one or more processors. The wireless device is configured to communicate over a wireless communication network and includes a modem and a battery. The one or more processors are configured to collect information relating at least to communication of the wireless device over the wireless communication network, to maintain, based on the collected information, an energy-prediction model that predicts amounts of energy needed in the wireless device for performing communication operations in the wireless communication network, and to schedule, for a communication operation that is to be performed by the wireless device in the wireless communication network, based on the energy-prediction model, a time at which the communication operation will be performed.

The present invention will be more fully understood from the following detailed description of the embodiments thereof, taken together with the drawings in which:

BRIEF DESCRIPTION OF THE DRAWINGS

FIGS. 5 and 6 are diagrams that schematically illustrate energy prediction schemes, including battery effective capacity prediction, in accordance with embodiments of the present invention.

DETAILED DESCRIPTION OF EMBODIMENTS

Introduction Regarding Batteries

Figure 1:
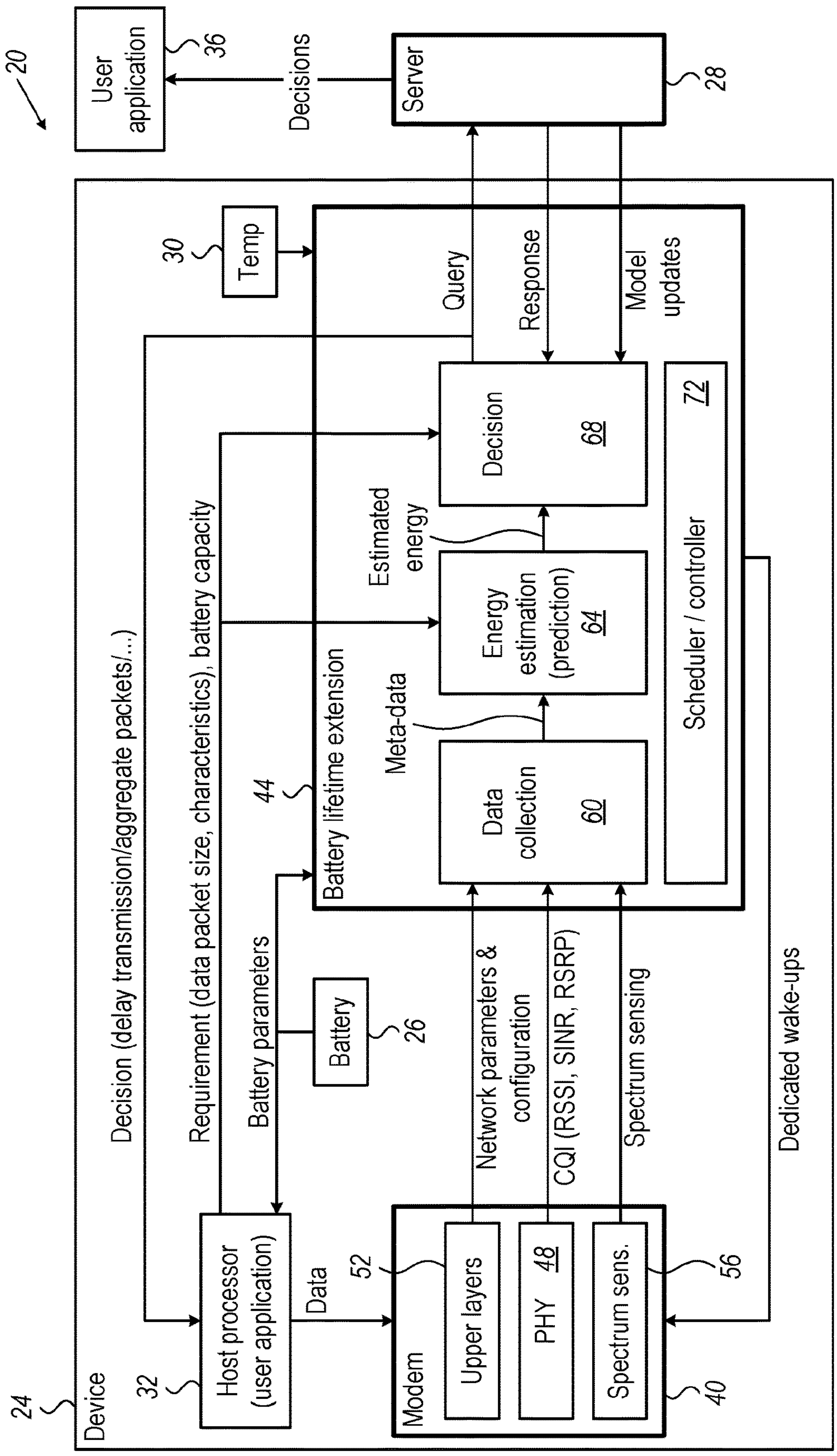
FIGS. 1 and 2 are block diagrams that schematically illustrate wireless IoT communication systems, in accordance with embodiments of the present invention.

Various types of IoT devices and other wireless communication devices are battery operated. Different types of batteries differ in chemistry, voltage, peak current, capacity, form factor and other properties. Considerations for choosing the proper battery for a given application may relate to cost, safety, capacity, peak current requirements, and other factors.

The electrical charge C stored within a battery is usually measured in milliampere-Hour (mAh). The charge and peak current of a battery are usually related, i.e., batteries can usually provide a current in the magnitude of 1C, e.g., a battery which has C=100 mAh will be able to deliver a peak current of 100 mA. When choosing a battery for a specific application, one needs to consider both capacity and peak current requirements.

When the application consumes a peak current that exceeds the peak current capabilities of the battery, the output voltage of the battery will typically drop below the nominal voltage. In addition, the excessive current draw will cause accelerated degradation of the battery capacity, due to the excessive wear of the battery capabilities.

Thus, for normal usage of the battery (i.e., usage that draws current below the rated peak current of the battery), the capacity drop of the battery will be equal to the amount of energy drained from it (e.g., a battery having a capacity of 100 mAh can deliver 10 mA for a duration of ten hours: similarly, after consuming 10 mAh, the remaining capacity will be 90 mAh).

However, for a device that consumes more than the specified peak current of the battery (as described above), the above example will not hold. For example, for a battery having a capacity of 100 mAh, a device drawing a current of 600 mA will not hold for 10 minutes, but for much less. The degradation in capacity depends on the magnitude of the excessive current being drawn, and on the continuous duration of such high current consumption.

If this continuous duration can be broken into shorter periods spaced from one another in time, the battery degradation will be less significant (even when the total duration remains the same). In other words, the impact of excessive current draw on the battery lifetime depends not only on the rated capacity of the battery, but also on the actual usage profile of the battery.

From the point of view of the application, the more important figure-of-merit is the battery's effective capacity, i.e., the practical amount of energy (e.g., pulses of energy consumed from the battery) that can be consumed. The effective capacity can be expressed, for instance, in terms of the number pulses, each having a certain amount of energy, that can be drained from the battery before it reaches its cutoff voltage (the minimal voltage at which the device can still operate).

For regular usage of batteries, the effective, practical amount of energy will be close to the rated capacity of the battery. For excessive usage, above the rated peak current, the battery effective capacity can be significantly lower than the rated capacity.

Some embodiments of the present invention, which will be described below, address the challenge of understanding how much activity can still be supported by a battery, at a given state, assuming a certain activity profile. The disclosed embodiments address both normal usage of batteries (below the rated peak current of the battery) and excessive usage of batteries (above the rated peak current). For the latter case, more elaborate modeling of the battery and device activity is performed. In the following sections we consider the prediction of the battery effective capacity as part of an energy-prediction model.

Overview

Embodiments of the present invention that are described herein provide methods and systems for reducing the energy consumption of wireless devices, thereby extending the device battery lifetime. The embodiments described herein refer mainly to IoT devices, by way of example, but the disclosed techniques are generally applicable to various other types of communication devices.

In some embodiments, one or more IoT devices (referred to herein as "devices") communicate with an application server (referred to herein as "server") over a wireless network, e.g., a cellular network. In practice, the amount of energy that is needed in a device for communicating a given message (transmitting or receiving a message) is not constant. The required amount of energy may vary over time. In addition, the required amount of energy may depend on factors such as the location in which the device is installed, on the configuration of the wireless network, on the wireless channel conditions, on the cellular network conditions (e.g., the level of utilization of the network), on ambient conditions (e.g., temperature), on the current time of day, as well as on application behavior. On the other hand, many IoT applications can tolerate considerable delays in message transfer. This tolerance enables some freedom in scheduling the transmission times of messages.

In some embodiments of the present invention, one or more processors in the system, in the devices and/or in the server, run software that schedules communication of messages using algorithms that aim to extend the device battery lifetime. For simplicity, the description that follows refers to "a processor" as carrying out the disclosed techniques. Generally, these techniques may be carried out using any number of processors, in the devices (e.g., in the devices' modems or host processors), in the server, or using any suitable "division of labor" between server-side and device-side processors.

In some embodiments, the processor collects information relating to communication over the wireless communication network, and possibly to other factors. Relevant information may comprise, for example, channel quality parameters, configuration parameters of the network (e.g., of a base station via which the device communicates), information about ambient conditions (e.g., temperature), information about the battery conditions, and metadata of the IoT application. Information can also be collected from external sources, including, but not limited to, nearby wireless devices. Based on the collected information, the processor maintains an energy-prediction model that predicts amounts of energy needed for communicating messages over the wireless communication network.

Then, for a specific message that is to be communicated with a device (e.g., between the device and the cloud), the processor schedules, based on the energy-prediction model, a time at which the message will be communicated. The scheduling algorithm aims to communicate messages at scheduled times ("transmission opportunities") that require lower energy, and avoid times characterized by high energy consumption. The scheduling algorithm may also consider constraints relating to, for instance, latency restrictions defined by the application. In an embodiment, the processor decides, based on the model, whether to communicate the message in a current transmission opportunity (e.g., time slot), or defer the decision to a future transmission opportunity.

In some embodiments, the energy-prediction model also comprises a complex model of the device battery. As explained above, in some batteries the effective remaining battery capacity depends not only on the total amount of energy delivered to the load (e.g., modem and host processor), but also on factors such as environmental conditions, usage profile and usage history (due to the accelerated degradation described above). In some embodiments, when scheduling communication of a message, the energy-prediction model uses these factors to predict the future state of the battery (also referred to as the battery effective capacity) following communication of the message.

More generally, in some embodiments the energy-prediction model is used for predicting the energy consumption of various types of communication operations that are performed by the IoT device, not only transmission and reception of messages. Other types of communication operations may comprise, for example, scanning for availability of a network, waking-up the device modem for sensing signals for improving the model, sleeping periods, etc. Any element of the energy-prediction model, e.g., predicting the remaining effective battery capacity, as well as making scheduling decisions, can be applied to such communication operations.

In some embodiments, development and updating of the energy-prediction model are performed exclusively on the device side. In other embodiments, the model is developed and maintained on the server side and downloaded to the device. In yet other embodiments, the model is developed and updated jointly by the device and by the server. Various hybrid schemes are described herein. Also described are schemes for sharing information among multiple devices for improving the energy-prediction models of the individual devices, and schemes for improving the models using information received from external sources such as sensors.

Various system configurations and implementation examples of the disclosed techniques are described herein.

System Description

FIG. 1 is a block diagram that schematically illustrates a wireless IoT communication system 20, in accordance with an embodiment of the present invention. System 20 comprises an IoT device 24 powered by a battery 26. Device 24 communicates with a server 28 over a wireless network (not shown in the figure), e.g., a cellular network. Server 28 may be a cloud-based server, and therefore server 28 and server-side user application 36 are sometimes referred to simply as "the cloud".

Device 24 comprises a host processor that runs a suitable user application. The device-side user application communicates with a server-side user application 36. This communication involves transmission of messages (e.g., packets) from device 24 to server 28, and from server 28 to device 24. The terms "messages" and "packets" are used interchangeably herein.

Device 24 further comprises a wireless modem 40 that transmits and receives messages over the wireless network, to and from server 28. The protocols used by modem 40, e.g., physical layer (PHY) and Medium-Access Control (MAC) protocols, depend on the protocols of the wireless (e.g., cellular) network. Modem 40 comprises a PHY module 48 that carries out the physical-layer tasks of the modem, and an upper-layers module 52 that carries out higher-layer tasks, typically MAC layer and above.

In the present embodiment modem 40 further comprises a spectrum sensing module 56 used for collecting some of the information used for energy prediction, as will be elaborated below. In other embodiments module 56 is omitted.

In the example of FIG. 1, IoT device 24 comprises a battery lifetime extension module 44 that schedules communication of messages to and from device 24, in order to reduce energy consumption in the device and extend the device battery lifetime. Battery extension module 44 is also referred to herein as "extension module" for brevity. Extension module 44 comprises a data collection module 60, an energy estimation module 64 (also referred to as energy prediction module), a decision module 68 (also referred to as a scheduling module that carries out a scheduling algorithm), and a scheduler/controller 72.

Although drawn in the figures as a separate module, in some embodiments module 44 is embedded as part of modem 40. For example, modem 40 may comprise a suitable processor that carries out the tasks of module 44. In alternative embodiments, module 44 may run on another suitable processor, e.g., on host processor 32 that also runs the user application. Module 44 is typically coupled to a suitable memory (not seen in the figure) that stores, for example, information collected by module 60 and part decisions taken by module 68.

Data collection module 60 is responsible for collecting and aggregating relevant information (also referred to as metadata) that is relevant to energy consumption estimation and to message transfer scheduling. Typically, although not necessarily, the information is collected from the various modules of modem 40. Non-limiting examples of collected information comprise:

- Current and past information collected from PHY module 48: Channel Quality Indicators (CQIs) such as Received Signal Strength Indicator (RSSI), Signal to Interference and Noise Ratio (SINR) Reference Signal Received Power (RSRP), 3GPP channel quality indicator, measurements of neighboring channels, etc.
- Information collected from upper-layers module 52, primarily network configuration and parameters. This information can be obtained, for example, by decoding network signaling messages, either broadcast or unicast. Network parameters may comprise, for example, configurations of the number of uplink and/or downlink repetitions configured by the base station.
- Information collected from spectrum sensing module 56: Metadata collected by sensing of the wireless spectrum, e.g., by scanning other frequency bands used by the wireless network.

The data collected by collection module 60 may be collected during normal activity of modem 40, i.e., during periods in which the modem wakes up to transmit and/or receive messages. Additionally, or alternatively, scheduler/controller 72 may wake-up modem 40 in dedicated wake-up periods, dedicated for collection of information for the sake of energy prediction and improving of the message scheduling algorithm. During the dedicated wake-up periods, the modem or host processor may, for example, sense the spectrum using module 56, receive and decode messages from the base station or from neighboring base stations, attempt to connect to the network, collect temperature measurements, or perform any other suitable operation. In deciding whether, when and how often to schedule dedicated wake-up periods, scheduler/controller 72 typically considers the energy consumption incurred by these wake-up periods.

In some embodiments, scheduler/controller 72 is autonomous in scheduling dedicated wake-up periods. In other embodiments, the scheduling of dedicated wake-up periods is only semi-autonomous. In these embodiments scheduler/controller 72 recommends a scheduling policy to server 28 or to host processor 32, but the final decision on policy is made by the server or host processor. In yet other embodiments, scheduler/controller 72 is non-autonomous, i.e., policies for scheduling of dedicated wake-up periods are made exclusively by server 28 or host processor 32.

Energy prediction module 64 is responsible for predicting the amount of energy needed in device 24 for transmitting or receiving a given message. Module 64 typically maintains an algorithmic model, referred to as "energy-prediction model", for this purpose. Module 64 typically receives from user application 32 information regarding the message to be communicated, e.g., message length, and possibly additional information such as the type of protocol (for instance, whether the protocol is UDP or TCP, whether security protocols are being used, which could have large impact on message size transfer, etc.).

Module 64 also receives the relevant information collected from modem 40 by module 60, and may also collect information from additional sources (external and/or internal to the device) such as temperature readings from a temperature sensor 30, etc. Module 64 may also receive information from host processor 32, such as processing time and power state information, as well as information relating to battery 26. In some embodiments module 44 may read the battery parameters directly.

Based on the available information, the energy-prediction model in module 64 estimates the amount of energy that will be needed in device 24 for communicating (transmitting or receiving, as appropriate) the given message. In practice, most of the needed energy is due to operation of modem 40, although other components (e.g., host processor 32) may also have a non-negligible contribution to energy consumption. In some embodiments, although not necessarily, module 64 first estimates the total duration needed for communicating the message (e.g., total TX duration or total RX duration), and then translates the total duration into a required amount of energy.

In some embodiments, in addition to predicting the energy needed for a specific message, the energy-prediction model may also enable additional logic and effective battery capacity management to be used more effectively according to the application. In one example, the scheduling algorithm can use the model for ensuring sufficient energy is kept at the end of the battery life for at least one emergency message.

In some embodiments, the energy-prediction model predicts the amount of energy needed for communicating a given message by estimating and fusing the following:

The expected activity profile of device 24 in transmitting the message, and overall activity profile (e.g., sleep durations, etc.).

Power consumption estimation of device 24.

Battery capacity estimation.

Example prediction schemes that consider these factors are describes in FIGS. 5 and 6 below.

Decision module 68 is responsible for deciding how to schedule communication of the message. The decision is based on the energy prediction provided by module 64, and may consider additional factors such as latency, message importance, remaining battery capacity, target battery lifetime, and others. Non-limiting examples of decisions that module 68 may take are:

Communicate (transmit or receive as appropriate) the message as-is (i.e., allow the host application to communicate the data via modem 40 to/from server 28).

Delay communication of the message. The delay may be a fixed delay or a dynamic delay, where the decision would be reexamined after specific period of time. Data delay could also be combined with aggregation of subsequent messages.

Query the server side for a recommendation regarding scheduling.

In some embodiments decision module 68 is autonomous in making and carrying out scheduling decisions, including decisions to wake-up the modem immediately to transmit a message). In other embodiments, the scheduling algorithm of decision module 68 is only semi-autonomous. In these embodiments the decision module recommends a scheduling decision to server 28 or to host processor 32, but the final decision is made by the server or host processor. Server 28 can also provide scheduling limitations/restrictions that the decision module needs to take into consideration. In yet other embodiments, decision module 68 is non-autonomous, i.e., scheduling decisions are made by server 28 or by host processor 32. In another embodiment, module 68 may also be configured to maintain enough energy to send an emergency message (e.g., towards the battery's end of life).

It is important to note that the scheduling algorithm running in module 68 may change its decisions at any given time according to specific application requirements, changes in battery effective capacity model, as well as changes (or projection of a change) in environmental conditions.

Scheduler/controller 72 is responsible for managing and orchestrating between data collection module 60, prediction module 64 and decision module 68. One example of the task of scheduler/controller 72, in some embodiments, is to decide when to wake-up modem 40 for performing spectrum sensing, and/or for updating the estimation of channel conditions and network configurations, and to control the modem accordingly.

In some embodiments, suitable interfaces are defined between host processor 32 and battery lifetime extension module 44 for carrying out the disclosed techniques. For example, when host processor 32 sends modem 40 data ("payload") of a message for transmission, the host processor also provides module 44 with scheduling constraints for this message. Constraints may comprise, for example, a maximal latency permitted for the message, battery constraints, etc. One type of battery constraint is a total energy budget (e.g., in Joules) that should not be exceeded in transmitting the message. Module 44 may use the constraints in various ways, e.g., use them autonomously to perform scheduling decisions, or return to the host processor with a recommended scheduling decision for approval.

In some embodiments, part of the data collection, prediction and decision tasks may be performed by server 28. For this purpose, module 44 in device 24 typically has suitable interfaces with modem 40 and/or host processor 32, to allow communication between module 44 and server 28. Server 28 may perform various parts of the data collection, prediction and/or decision tasks.

In one example, in response to a query from module 44 in device 24, server 28 may take a scheduling decision (e.g., a decision to communicate the message now or to defer communication to a later time), and instruct device 24 to carry out the decision. Since interaction with the server takes time and incurs power, this scheme typically applies to long messages and/or to buffered messages that are waiting for transmission. As another example, server 28 may notify server-side user application 36 of the communication conditions on the device side.

As yet another example, server 28 may update the user application (on the server side and/or on the device side) and/or the network operator regarding issues found on the network side. Non-limiting examples of such issues include deterioration of wireless conditions, which result in poor coverage, change in network parameters affecting battery lifetime of the specific device 24, etc.

Additionally, or alternatively, server 28 may update the user application (on the server side and/or on the device side) and/or the network operator regarding issues found on the device side. Such issues may comprise, for example, anomalies or statistics relating to battery 26, e.g., a battery whose observed performance deviates considerably from the expected or predicted performance, or anomalies relating to the device itself, e.g., energy consumption that differs from the expected consumption.

In some embodiments, server 28 is responsible for downloading at least part of the energy-prediction model to devices 24, and to update the model with parameters as needed.

In some embodiments, the energy-prediction model in module 64 is not limited to predicting energy associated with transmission and reception of messages. More generally, the energy-prediction model can predict the amount of energy that will be needed in device 24 for performing other kinds of communication operations. Example operations may comprise, for example, scanning for a network, waking-up the model for receiving messages or for sensing signals, sleeping periods (in between communication messages), etc. By the same token, the scheduling algorithm in decision module 68 can be used for scheduling any such communication operation. Note that "going to sleep", i.e., setting the modem to a defined sleep period, is also regarded herein as a type of communication operation. Any of the techniques that are described herein in the context of message transmission/reception (e.g., estimation of remaining effective battery capacity) can be used in a similar manner in the context of other communication operations.

Information Sharing Across Multiple Devices

Figure 2:
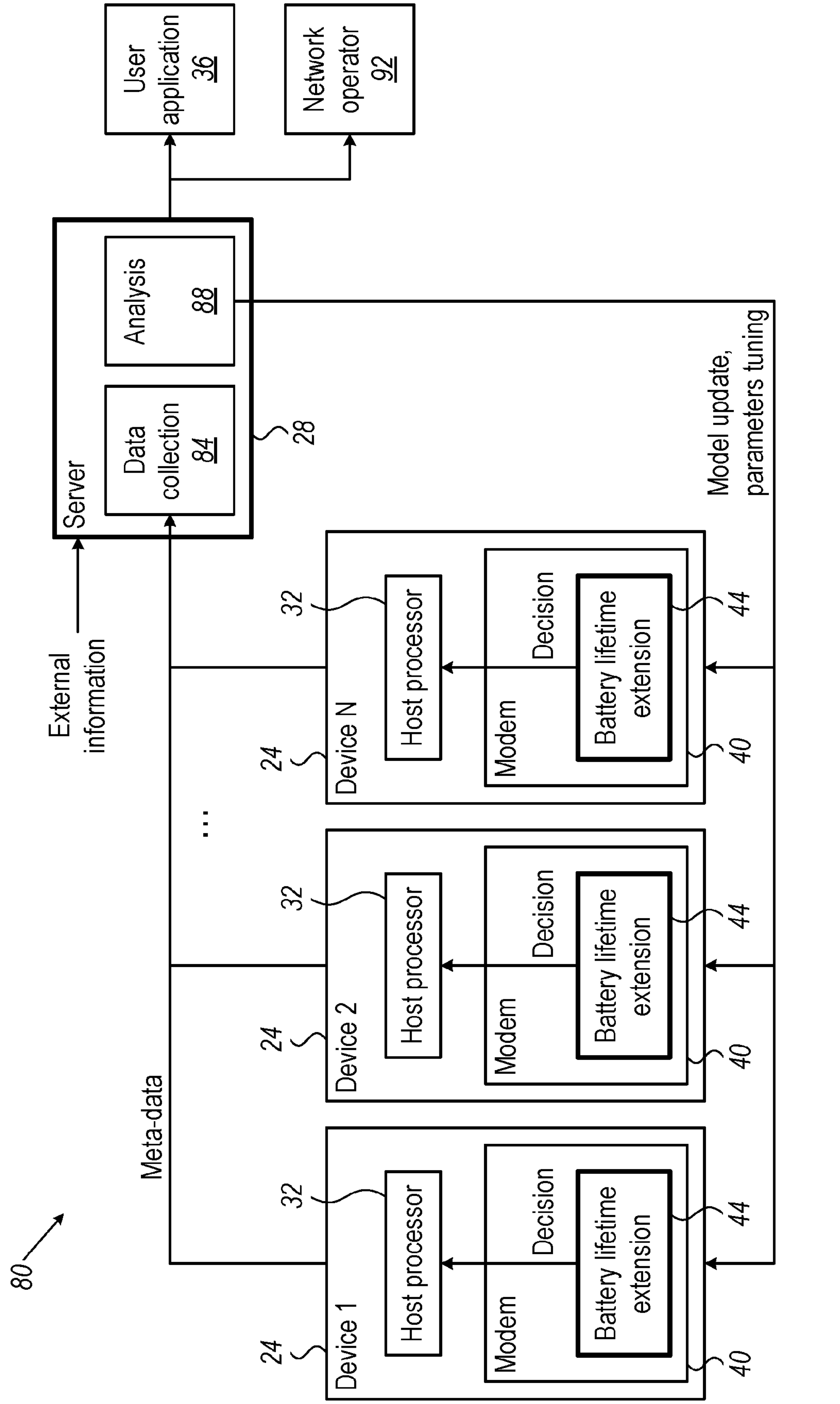

FIG. 2 is a block diagram that schematically illustrates a wireless IoT communication system 80, in accordance with another embodiment of the present invention. In the present embodiment, information collected by multiple IoT devices 24 is fused and used to improve the energy prediction and scheduling algorithm and decisions in a given device 24.

As seen in the figure, server 28 communicates with multiple device 24, each device comprising a respective battery lifetime extension module 44 that runs an algorithmic energy-prediction model. Server 28 comprises a server-side data collection module 84 (not to be confused with data collection modules 60 in devices 24), and an analysis module 88.

Server-side data collection module 84 obtains information that was collected by data collection modules 60 of the multiple devices 24. Analysis module 88 uses the information collected by the plurality of devices 24 to refine the energy-prediction model and scheduling algorithms and/or decisions. Analysis module 84 downloads model updates and updated parameters to devices 24, to be used locally for prediction and scheduling by modules 44 in the devices.

Server 28 can also take into account information from additional, external sources, into its decision. External information may comprise, for instance, locations of devices 24, knowledge about network configurations (received from network side), etc.

The rationale behind the configuration of FIG. 2 is that a group of devices 24 located in the same area may experience similar wireless conditions, and/or camp on same base stations and therefore experience similar network parameters. In such a case, the energy-prediction model and scheduling decision/algorithm in a given device 24 can be improved if it is updated based on information collected from the group of devices.

As a demonstrative example, consider a scenario in which server 28 collects statistics that indicate high levels of interference in a certain geographical area for certain times (e.g., around noon every day). The server can then notify devices 24 in this area not to communicate during this time frame, and instead communicate at night. Alternatively, the server can download this global metadata to devices 24 in the area, causing the devices to update their model accordingly.

In practice, sending the collected metadata in raw form from devices 24 to server 28 may require considerable amounts of energy. Thus, in some embodiments, devices 24 downsize (e.g., compress or digest) the collected information before sending it to the server, or perform partial preprocessing on the data to allow sending only the relevant information that will be used by the server for further processing.

In the above description, devices 24 improve their energy-prediction models by sharing information via server 28. In other embodiments, devices 24 may share collected information with one another directly, using device-to-device communication.

In various embodiments, the model or models downloaded to device 24 may be device-specific (i.e., optimized per individual device 24), device-group-specific (i.e., optimized for a group of devices 24), or generic. The downloaded information (relating to prediction and/or scheduling) can be fused with algorithms running on devices 24. Alternatively, the downloaded information may be completely defined by the server. The generation of the model or models on the server side may be based on information that is uploaded, and possibly pre-processed, by devices 24.

By sharing collected information among multiple devices 24, typically nearby devices that share similar conditions, each individual device is able to improve the performance of its energy-prediction model and scheduling/decision algorithm. For example, nearby devices can share link quality information, thereby enabling each device to achieve less noisy predictions. As another example, nearby devices may share information regarding their history of scheduling decisions (e.g., statistics of the amounts of energy that were needed for sending messages at certain times in the past), enabling the device to improve their future scheduling policies. As yet another example, nearby devices may synchronize their scheduling policies, so as to enhance their statistics. For example, when different devices happen to transmit at different times of the day, the joint information provides a joint overall view of transmission opportunities.

In various embodiments, the system (e.g., server 28) may use various schemes for deciding how to divide the devices into groups for the sake of information sharing. In one embodiment, the devices served by a given base station are regarded as nearby, and are therefore grouped together for the sake of information sharing and model improvement.

In some embodiments, server 28 may share analyzed information with a network operator system 92, e.g., for improving the network's Key Performance Indicators (KPIs). The analysis of metadata collected from multiple devices 24 can lead to better conclusions being sent to the network operator. Consider, for example, a scenario in which cellular coverage becomes degraded for some devices 24, a scenario in which a change in the network parameters has a negative impact on the performance of devices 24 (e.g., latency, message success rate or battery life), or a scenario in which some devices 24 suffer from interference that is not sensed by the network (e.g., by the base stations). In any of these scenarios, server 28 may report the observed anomality in performance to network operator system 92. Server 28 may also indicate a possible cause for the anomality (e.g., whether the likely cause is a change in wireless conditions, interference sensed using spectrum sensing, or identification of a change in network parameters). Note that this sort of identification and reporting is not limited to system 80 of FIG. 2, and may be used in system 20 of FIG. 1, as well.

For improving the network KPIs, any device 24 may sense the radio spectrum (autonomously or upon request from the server), collect information regarding link quality (e.g., interference level), process the information, and send the processed information to the server. Such processed information may include recommendations for link parameter updates that would improve overall performance.

When operating autonomously, the device may decide when to wake-up for sensing the spectrum, how to process the collected information, and/or perform any other suitable action or decision. In one example, while a device 24 performs regular scans of the radio spectrum, the device may sense for interference on specific frequencies, and send the server a list of frequencies that suffer from interference.

The system, device and server configurations shown in FIGS. 1 and 2 are example configurations that are chosen purely for the sake of conceptual clarity. In alternative embodiments, any other suitable configurations can be used. System, device and server elements that are not mandatory for understanding of the disclosed techniques have been omitted from the figures for the sake of clarity.

The various elements of systems 20 (FIG. 1) and 80 (FIG. 2), device 24 and server 28 may be implemented using suitable hardware, such as in one or more microprocessors, Application-Specific Integrated Circuits (ASICs) or Field-Programmable Gate Arrays (FPGAs). In some embodiments, some system elements, e.g., host processor 32, server 28, and/or some or all of battery lifetime extension module 44, can be implemented using software, or using a combination of hardware and software elements.

In some embodiments, some system elements, e.g., host processor 32, server 28 and/or some or all of battery lifetime extension module 44, may be implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

In various embodiments, the energy-prediction model running in devices 24 (in prediction modules 64 of battery lifetime extension modules 44) and/or in server 28 also comprises a model of the device battery. In some batteries, the amount of energy drained from the battery depends not only on the amount of energy spent on communicating the message, but also on factors such as environmental conditions (e.g., temperature and humidity), and past usage pattern. For example, in some batteries, for the same transmission task that requires the same amount of energy, the battery will be drained more severely if subjected to a dense usage pattern in the recent past. In some embodiments, when scheduling communication of a message, the energy-prediction model uses the battery model to predict the future state of the battery following communication of the message (e.g., the effective energy capacity remaining in the battery following communication of the message). The battery model can be learned and/or updated on the device side, on the server (cloud) side, or both.

In various embodiments, the energy-prediction model running in devices 24 (in prediction modules 64 of battery lifetime extension modules 44) and/or in server 28 may comprise any suitable type of model, e.g., a suitable rule-based model or a suitable Machine Learning (ML) model. In some embodiments, all devices 24 use the same generic model. In other embodiments, each device uses its own dedicated model (which may have been adapted from a preliminary generic model). In other embodiments, several models are assigned to a group of devices.

In some embodiments, training of the model is performed in the device, meaning that each device updates its respective model based on the information collected locally at that device. In other embodiments, training of the model is performed in the server, typically based on information collected by multiple devices, and downloaded to the devices.

In some embodiments, the model is trained partially by the devices and partially by the server. For example, a device may develop and/or update a model and send the model to the server. The server would then update the model by fusion of additional information from other sources (e.g., from other devices), and then download the updated model (the entire model or only incremental changes to the model) to the device. Such a hybrid configuration may provide a good balance between training quality and communication (and thus energy) overhead.

In some embodiments, the energy-prediction model may be optimized per each group of devices 24, e.g., separately per groups of collocated devices. In such embodiments, the server may aggregate information from multiple devices (and possibly also from other sources) to generate an optimized scheduling profile for the devices in a given region. For example, in a region where interference is expected to be low at night, the server may instruct the devices in this region to transmit more frequently at night than during the day.

Additionally or alternatively, the model can be adapted to suit needs of a specific customer or user application (e.g., required average time between messages, minimal and/or maximal allowed time between sequential messages, etc.)

Example Use Case

Figure 3A:
FIGS. 3A-3C are graphs that schematically illustrate scheduling of message transmissions for battery lifetime extension, in accordance with an embodiment of the present invention.
Figure 3B:
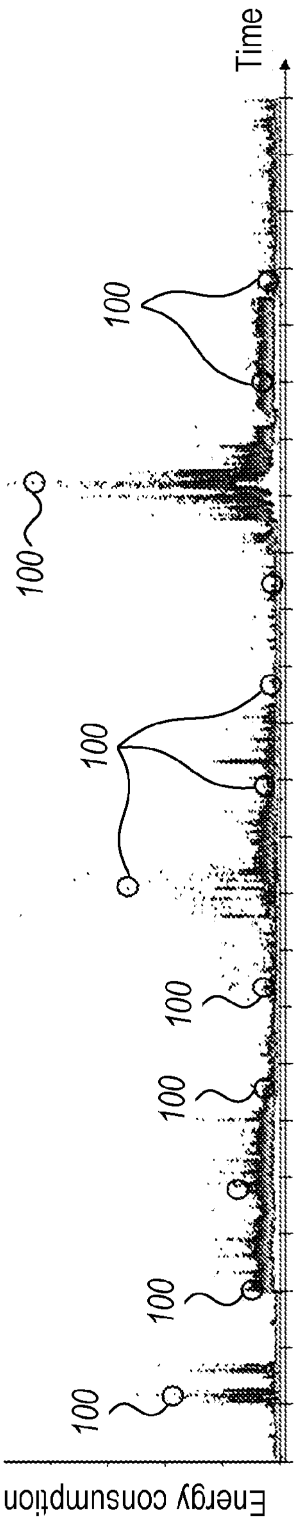
Figure 3C:
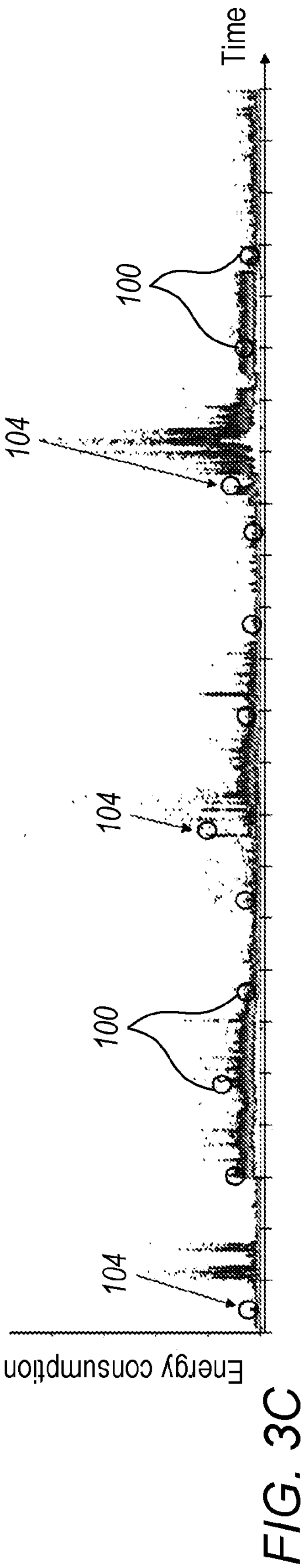

FIGS. 3A-3C are graphs that schematically illustrate scheduling of message transmissions for battery lifetime extension, in accordance with an embodiment of the present invention. This example demonstrates the effectiveness of the disclosed technique in reducing energy consumption, and thus extending the battery lifetime of devices 24.

FIG. 3A shows the energy needed in a certain real-life stationary IoT device 24 for transmitting a given message, as a function of time over a period of twenty-four hours. As seen, the device energy consumption varies considerably over time.

FIG. 3B illustrates the operation of a conventional IoT device (without scheduling using the disclosed techniques). In the present example, the device sends messages at regularly-spaced instances 100, without considering energy consumption. As seen, some instances 100 occur when the needed energy consumption is high, thereby shortening the device battery lifetime.

FIG. 3C illustrates the operation of a device 24 that schedules transmission of messages in accordance with an embodiment of the present invention. In this embodiment, device 24 is able to avoid the high-energy instances, and instead transmit the messages at alternative, low-energy instances 104. The total average energy consumption is thus reduced considerably, and battery lifetime is increased.

Example Method Description

Figure 4:
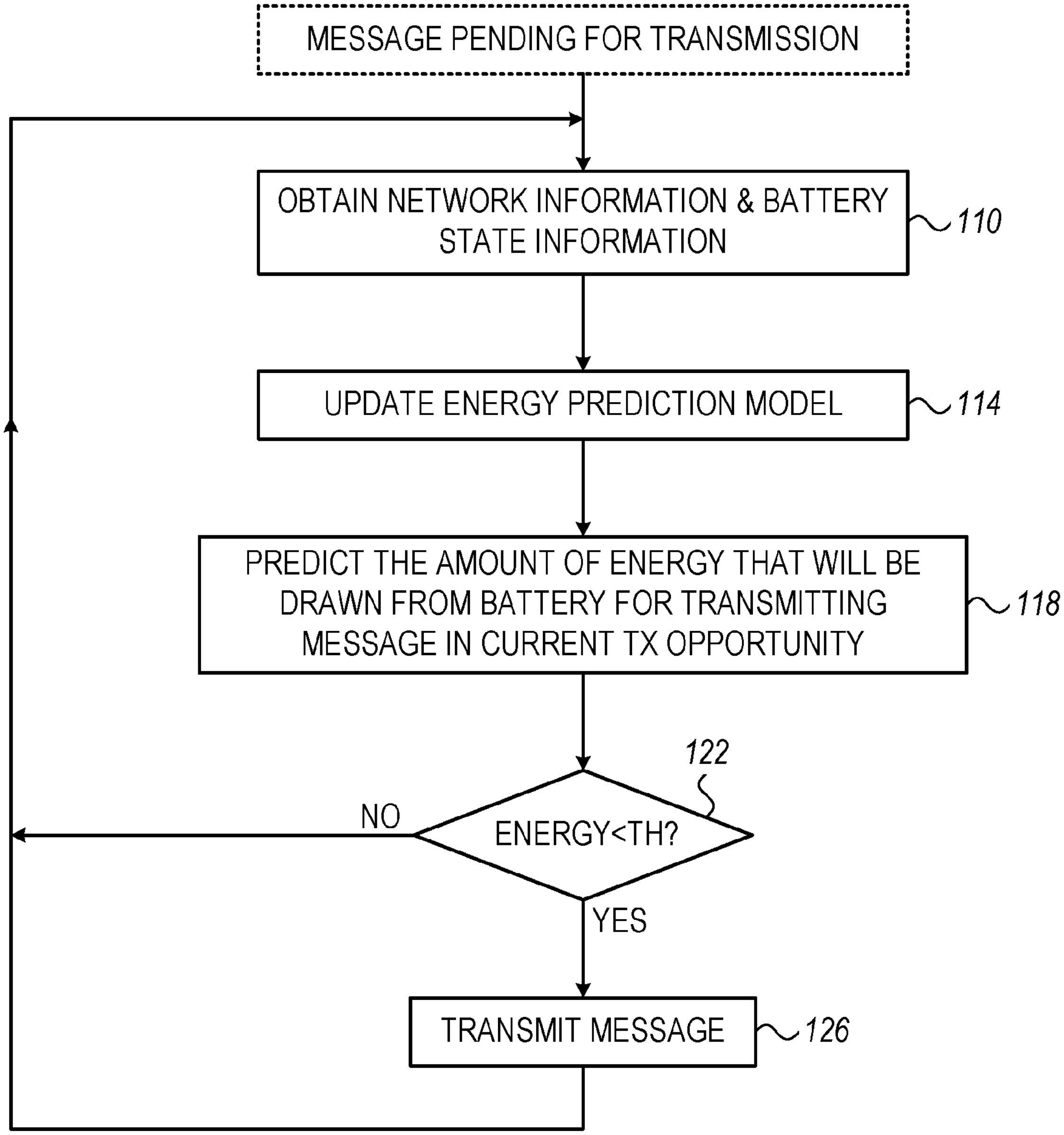
FIG. 4 is a flow chart that schematically illustrates a method for scheduling message transmissions for battery lifetime extension, in accordance with an embodiment of the present invention.

FIG. 4 is a flow chart that schematically illustrates a method for scheduling message transmissions for battery lifetime extension, in accordance with an embodiment of the present invention. The method begins with a message pending for transmission from device 24 to server 28.

At a data collection stage 110, data collection module 60 in device 24 collects relevant information for scheduling transmission of the message. The information may comprise (i) network-related information collected from modem 40, e.g., measurement of updated RSSI, SINR and/or RSRP values, and (ii) battery state information relating to the battery of device 24.

At a model updating stage 114, prediction module 64 in device 24 updates the energy-prediction model with the newly-collected information. At a prediction stage 118, prediction module 64 uses the energy-prediction model to estimate the amount of energy that will be needed to transmit the message in the current transmission (TX) opportunity.

At a threshold checking stage 122, decision module 68 in device 24 compares the needed amount of energy to a threshold. The threshold may be fixed or adaptive (e.g., variable depending on observed channel conditions). Hybrid solutions that use both fixed and adaptive thresholds can also be used. If the needed amount of energy is below the threshold, decision module 68 decides to transmit the message in the current TX opportunity, and instructs modem 40 to do so, at a transmission stage 126. If the needed amount of energy exceeds the threshold, decision module 68 decides not to transmit the message in the current TX opportunity, and the method loops back to stage 110 above. As explained above, part of the scheduling algorithm in decision module 68 typically decides when to wake-up for the next TX opportunity.

The method flow of FIG. 4 is an example flow that is chosen purely for the sake of conceptual clarity. In alternative embodiments, any other suitable flow can be used.

Figure 5:
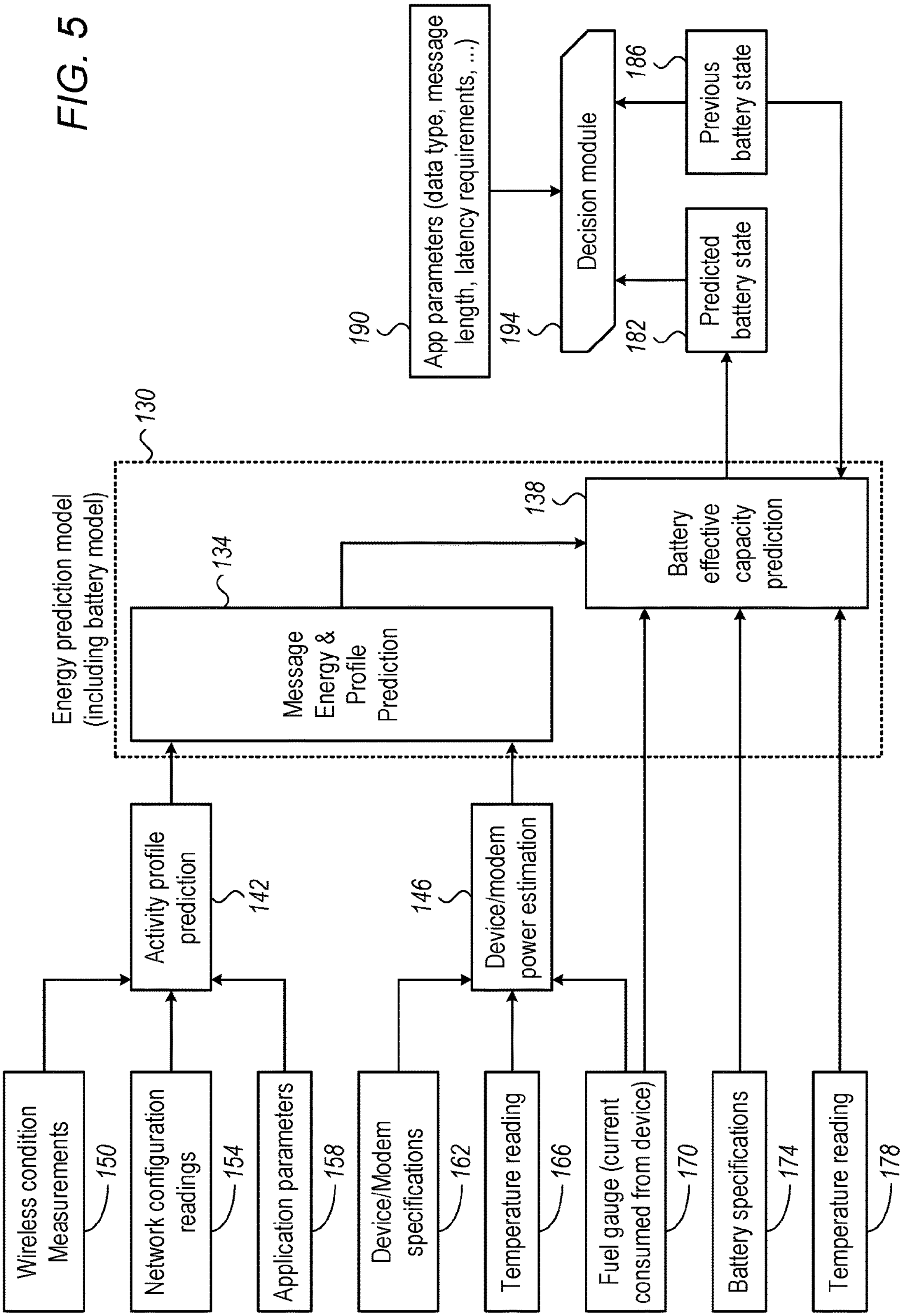

Example Energy Prediction Schemes Including Battery Effective Capacity Prediction FIG. 5 is a diagram that schematically illustrates an energy prediction scheme, including battery effective capacity prediction, in accordance with an embodiment of the present invention. This scheme can be used, for example, for implementing energy prediction module 64 in battery lifetime extension module 44 of IoT device 24 of FIG. 1. The scheme of FIG. 5 is best suited for normal usage of battery 26, i.e., for usage patterns that do not draw more current than the peak rated current of the battery. FIG. 6 below shows an alternative scheme, which uses a complex model of the battery and is best suited for usage patterns that considerably exceed the battery peak rated current.

In the scheme of FIG. 5, an activity profile prediction module 142 estimates the active time that IoT device 24 spends in each mode while attempting to connect and send a given message to the server side. Module 142 estimates the active times based on the following:

- Wireless condition measurements 150, for example RSRP, SINR, CQI, doppler and others, which are collected during current and/or past wake-ups of device 24.
- Network configuration readings 154, such as timers, uplink and downlink repetitions, Discontinuous reception (DRX) configurations, etc.
- Application parameters 158, such as message length, protocols to be used, etc.

In various embodiments, wireless condition measurements 150 and network configuration readings 154 may be collected based on past, wake-ups of modem 40, and/or based on a current wake-up that is scheduled immediately before the attempt to send the message in order to obtain more reliable inputs about the wireless and network conditions. These inputs are fused together with application parameters 158 to predict the activity profile the modem would experience if the message were to be sent now.

In one example, in transmitting a given message, modem 40 goes through the following sequence of modes:

| Mode | Duration (sec) |
|---|---|
| Scan | T1 |
| Transmit @23 dBm | T2 |
| Receive | T3 |
| DRX (Connected) | T4 |
| Transmit @0 dBm | T5 |
| Receive | T6 |
| DRX (Idle) | T7 |
| Transmit @0 dBm | T8 |

The above information can be collected, for example, using suitable timers or counters in modem 40. Activity profile prediction module 142 may provide such an activity profile as output. The table can also be collapsed to represent each mode by a single entry (e.g., a single entry for the "Receive" mode with a total duration of T3+T6, and a single entry for the "Transmit @0 dBm" mode with a total duration of T5+T8).

A device/modem power estimation module 146 estimates the expected power consumption of device 24 (or only of modem 40) at each power state. Module 146 performs this estimation by fusing the following inputs:

- Device/modem specifications 162, e.g., a power management scheme of the device, network configurations (e.g., frequencies at which the modem operates), and/or wireless conditions (e.g., at low RSRP RF power may be higher).
- Temperature readings 166 (which have direct impact on power consumption during active/sleep) and possibly other ambient conditions.
- A "Fuel gauge" 170—Measurements of the current consumption of the device, measured by suitable circuitry in the device.

Following the above example, the output of module 146 is a list or table that gives the power level of the device or modem in each mode:

| Mode | Power (mW) |
|---|---|
| Scan | P1 |
| Receive | P2 |
| Transmit @23 dBm | P3 |
| Transmit @0 dBm | P4 |
| DRX (Connected) | P5 |
| DRX (Idle) | P6 |

The outputs of modules 142 and 146 are provided to an energy-prediction model 130, which comprises a message energy prediction module 134 and a battery effective capacity prediction module 138.

Module 134 predicts the energy that will be required for transmitting the message in the current TX opportunity. In an embodiment, module 134 multiplies the total duration (in see) spent in each mode by the power consumption (in mW) of that mode, to obtain the total energy (in mWs) needed for transmitting the message. Following the above example, the total message energy is given by P1·T1+P2·(T3+T6)+P3·T2+P4·(T5+T8)+P5·T4+P6·T7.

The predicted message energy is provided to battery effective capacity prediction module 138, which estimates the remaining battery capacity assuming the message is sent. In addition to the predicted message energy, module 138 may take into account the following:

Measured current consumption ("fuel gauge" 170).

Battery specification 174, for example previous measurements of battery state (e.g., measurements of battery internal resistance and/or voltage level, and/or calculations based on history usage).

Temperature readings 174.

Based on the above factors, module 138 estimates the remaining battery capacity assuming the message is transmitted in the current TX opportunity. In one simple implementation, the battery capacity (in mAh) is reduced by the total predicted message energy (output of module 134, also in mAh).

In the embodiment of FIG. 5, the remaining battery capacity (output of module 138, and of module 130 as a whole) is used for updating a predicted battery state 182. A decision module 194 uses predicted battery state 182, in combination with a previous battery state 186 and application parameters 190, to decide whether to transmit the message in the current TX opportunity or to defer the decision to a later TX opportunity.

If the decision is to transmit, decision module 194 instructs modem 40 to transmit the message. Module 194 may update energy-prediction model 130 and/or its various inputs and components (e.g., the activity profile and device/modem power consumption). If the decision is to defer the transmission, module 194 instructs modem 40 to go to sleep mode for a specified period of time (as determined by the scheduling algorithm). In either case, module 194 may updated the battery state.

FIG. 6 is a diagram that schematically illustrates an alternative energy prediction scheme, including battery effective capacity prediction, in accordance with another embodiment of the present invention. This scheme, too, can be used for implementing energy prediction module 64 in battery lifetime extension module 44 of IoT device 24 of FIG. 1. The scheme of FIG. 6 is best suited for usage patterns that considerably exceed the battery peak rated current.

As explained above, when excessive current is drawn from the battery, the battery capacity degrades more severely for long periods of relatively high-power consumption operation. Therefore, a simple multiplication of the total active time by the average power consumption may not provide a good indication for the expected capacity following the message transmission. Instead, some low-level information regarding the activity profile, including information about power consumption bursts, is needed. Other useful information for predicting the effective battery capacity may include historical usage and environment conditions (e.g., temperature, humidity, air pressure, etc.) along the battery lifetime.

The embodiment of FIG. 6 comprises a battery effective capacity prediction module 200, a message energy prediction module 204, and a decision module 208 (also referred to as a scheduling module).

As explained at length above, message energy prediction module 204 maintains a predicted activity profile 228 of device 24 based on network and channel conditions 232 and on application data 236. An example of a predicted activity profile 228 is seen at the top of the figure. In this example the profile comprises sever time periods numbered 1, which differ in the operational mode of modem 40 and thus in current consumption. Time period 4, for example, is a sleep period characterized by very low current consumption. This period also helps the battery recover from bursts of excessive current draw.

Battery effective capacity prediction module 200 maintains a battery state 212, which comprises battery state parameter values defined by the algorithmic model of the battery. A battery state predictor 216 uses the battery state parameter values for predicting the expected state of the device battery, given certain usage and conditions. In one example the prediction depends on temperature readings 224. In particular, predicting the battery state includes predicting the remaining battery effective capacity. A state update module 220 updates battery state 212 based on the predictions on predictor 216.

Decision module 208 sends queries to battery effective capacity prediction module 200, requesting module 200 to evaluate the impact of various possible activities on the battery state. An evaluated activity may be, for example, a wake-up for sending a message, a dedicated wake-up for the purpose of improving the algorithm, or a sleeping period. The query for a given activity specifies (i) a potential activity profile and (ii) an expected energy consumption for that activity. Module 200 typically responds to a query with the expected change to the battery effective capacity. After receiving this response, decision module 208 typically takes an action, and instructs update module 220 in module 200 to update battery state 212.

The energy-prediction schemes of FIGS. 5 and 6 are example schemes that have been chosen purely for the sake of clarity. In alternative embodiments, any other suitable scheme can be used. As noted above, the disclosed schemes are also able to identify possible malfunctions in battery 26, or elsewhere in device 24, and report accordingly to server 28. The server may in turn report this malfunction to the user application. A malfunction can be detected, for example, by identifying a large deviation between the actual and expected battery model state.

Moreover, the collected and preprocessed data relating to the activity profile and/or the battery states and battery model, stored per device 24, can be uploaded to server 28. This data allows collecting valuable information regarding battery characteristics from multiple devices 24 deployed in the field. This information can be used for improving the performance of batteries, by improving the design of the batteries and/or designing batteries for the specific use-cases and activity profiles of the devices.

In various embodiments, the processor or processors in the system (e.g., in device 24, in server 28 or both) update the energy-prediction model (including the battery state model and the scheduling model) on-the-fly. Updates may be based on measurements taken before, during and/or after transmission of a message.

Although the embodiments described herein mainly address wireless devices such as IoT devices, the methods and systems described herein can also be used in other applications, such as in various other electronic devices that (i) are powered by batteries, (ii) are subject to challenging energy constraints, and (ii) are able to autonomously maintain their activity profile.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
collecting information relating at least to communication of a wireless device over a wireless communication network;
maintaining, based on the collected information, an energy-prediction model that predicts amounts of energy needed in the wireless device for performing communication operations in the wireless communication network;
for a communication operation that is to be performed by the wireless device in the wireless communication network, scheduling, based on the energy-prediction model, a time at
which the communication operation will be performed; and
performing the communication operation at the scheduled time,
wherein scheduling the time based on the energy-prediction model comprises:
receiving a total energy budget that should not be exceeded in communicating the message; and
scheduling the time so as to meet the total energy budget.

2. The method according to claim 1, wherein performing the communication operations comprises communicating messages over the wireless communication network.

3. The method according to claim 1, wherein performing the communication operations comprises scanning for availability of the wireless communication network.

4. The method according to claim 1, wherein performing the communication operations comprises waking-up a modem of the wireless device and receiving signal by the modem.

5. The method according to claim 1, wherein performing the communication operations comprises setting a modem of the wireless device to a sleep period.

6. The method according to claim 1, wherein scheduling the time comprises deciding on the time in accordance with a scheduling policy that aims at least to maximize a lifetime of a battery of the wireless device.

7. The method according to claim 1,
wherein collecting the information comprises collecting information relating to a battery of the wireless device;
wherein maintaining the energy-prediction model comprises predicting, based on the information relating to the battery, an effective energy capacity remaining in the battery following the communication operation; and
wherein scheduling the time depends on the effective energy capacity.

8. The method according to claim 1, wherein scheduling the time comprises deciding whether to perform the communication operation in a current time period or to defer a decision on performing the communication operation to a later time period.

9. The method according to claim 1, wherein maintaining the energy-prediction model is performed in the wireless device.

10. The method according to claim 1, wherein maintaining the energy-prediction model is performed in a server that communicates with the wireless device over the wireless communication network.

11. The method according to claim 1, wherein maintaining the energy-prediction model is performed partially in the wireless device and partially in a server that communicates with the wireless device over the wireless communication network.

12. The method according to claim 1, wherein collecting the information comprises at least one of waking-up a modem of the wireless device or of one or more additional wireless devices, to collect the information in one or more dedicated wake-up periods, which are dedicated for maintaining the energy-prediction model.

13. The method according to claim 1, and comprising sharing at least part of the collected information, or preprocessed information that is derived from the collected information, with an operator of the wireless communication network.

14. The method according to claim 1, and comprising reporting, based on the collected information, an anomality or a statistical information regarding the battery.

15. A method for communication, comprising:
collecting information relating at least to communication of a wireless device over a wireless communication network;
maintaining, based on the collected information, an energy-prediction model that predicts amounts of energy needed in the wireless device for performing communication operations in the wireless communication network;
for a communication operation that is to be performed by the wireless device in the wireless communication network, scheduling, based on the energy-prediction model, a time at
which the communication operation will be performed; and performing the communication operation at the scheduled time, wherein collecting the information further comprises collecting additional information relating to communication of one or more additional wireless devices over the wireless communication network; and wherein maintaining the energy-prediction model is based both on the information relating to the wireless device and on the additional information relating to the additional wireless devices.

16. A communication apparatus, comprising:

a wireless device configured to communicate over a wireless communication network, the wireless device comprising a modem and a battery; and one or more processors, configured to:

collect information relating at least to communication of the wireless device over the wireless communication network;

maintain, based on the collected information, an energy-prediction model that predicts amounts of energy needed in the wireless device for performing communication operations in the wireless communication network;

for a communication operation that is to be performed by the wireless device in the wireless communication network, schedule, based on the energy-prediction model, a time at which the communication operation will be performed, wherein to schedule the time based on the energy-prediction model, the one or more processors are further configured to:

receive a total energy budget that should not be exceeded in communicating the message; and schedule the time so as to meet the total energy budget.

* * * * *